US009969462B2

(12) United States Patent
Hara

(10) Patent No.: US 9,969,462 B2
(45) Date of Patent: May 15, 2018

(54) BICYCLE SHIFTING SYSTEM

(71) Applicant: Shimano Inc., Sakai, Osaka (JP)

(72) Inventor: Nobukatsu Hara, Osaka (JP)

(73) Assignee: Shimano Inc., Osaka (JP)

(*) Notice: Subject to any disclaimer, the term of this patent is extended or adjusted under 35 U.S.C. 154(b) by 162 days.

(21) Appl. No.: 15/019,731

(22) Filed: Feb. 9, 2016

(65) Prior Publication Data
US 2017/0225743 A1 Aug. 10, 2017

(51) Int. Cl.
B62M 25/08 (2006.01)
B62M 9/132 (2010.01)
B62M 9/122 (2010.01)
B62M 25/04 (2006.01)
B62M 9/123 (2010.01)
B62M 9/133 (2010.01)

(52) U.S. Cl.
CPC ............ B62M 25/08 (2013.01); B62M 9/122 (2013.01); B62M 9/123 (2013.01); B62M 9/132 (2013.01); B62M 9/133 (2013.01); B62M 25/04 (2013.01)

(58) Field of Classification Search
CPC ...... B62M 9/121; B62M 9/122; B62M 9/131; B62M 9/132; B62M 25/04; B62M 25/08
See application file for complete search history.

(56) References Cited

U.S. PATENT DOCUMENTS

| 8,727,367 | B2* | 5/2014 | Talavasek | B62K 19/00 280/274 |
| 2014/0070930 | A1* | 3/2014 | Hara | B62M 25/00 340/432 |
| 2014/0179470 | A1 | 6/2014 | Savard | |
| 2014/0290411 | A1* | 10/2014 | Kuroda | B62M 25/04 74/473.12 |
| 2014/0290412 | A1* | 10/2014 | Emura | B62M 25/08 74/473.12 |

* cited by examiner

Primary Examiner — William E Dondero
Assistant Examiner — Robert T Reese
(74) Attorney, Agent, or Firm — Global IP Counselors, LLP

(57) ABSTRACT

A bicycle shifting system is basically provided with a first shifting device, a second shifting device and a controller. One of the first shifting device and the second shifting device is mechanically operated, while the other of the first shifting device and the second shifting device is electrically operated. The controller is configured to operate at least one of the first shifting device and the second shifting device in accordance with at least one of a predetermined upshifting route and a predetermined downshifting route.

27 Claims, 11 Drawing Sheets

| | | | FC | |
|---|---|---|---|---|
| | | | 24 | 38 |
| | | | LOW | TOP |
| CS | 36 | 1st | 0.67 | 1.00 |
| | 32 | 2nd | 0.75 | 1.19 |
| | 28 | 3rd | 0.86 | 1.36 |
| | 24 | 4th | 1.00 | 1.58 |
| | 21 | 5th | 1.14 | 1.81 |
| | 19 | 6th | 1.28 | 2.00 |
| | 17 | 7th | 1.41 | 2.24 |
| | 15 | 8th | 1.60 | 2.53 |
| | 13 | 9th | 1.85 | 2.92 |
| | 11 | 10th | 2.18 | 3.45 |

|     |      | FC    |      |
| --- | ---  | ---   | ---  |
|     |      | 24    | 38   |
|     |      | Low   | Top  |
| CS  | 36   1st | 0.67 | 1.06 |
|     | 32   2nd | 0.75 | 1.19 |
|     | 28   3rd | 0.86 | 1.36 |
|     | 24   4th | 1.00 | 1.58 |
|     | 21   5th | 1.14 | 1.81 |
|     | 19   6th | 1.28 | 2.00 |
|     | 17   7th | 1.41 | 2.24 |
|     | 15   8th | 1.60 | 2.53 |
|     | 13   9th | 1.85 | 2.92 |
|     | 11   10th| 2.16 | 3.45 |

FIG. 11

|    |     | FC     |      |      |
|----|-----|--------|------|------|
|    |     | 24     | 32   | 42   |
|    |     | Low    | Mid  | Top  |
| 36 | 1st | 0.67   | 0.89 | 1.17 |
| 32 | 2nd | 0.75   | 1.00 | 1.31 |
| 28 | 3rd | 0.86   | 1.14 | 1.50 |
| 24 | 4th | 1.00   | 1.33 | 1.75 |
| 21 | 5th | 1.14   | 1.52 | 2.00 |
| 19 | 6th | 1.26   | 1.68 | 2.21 |
| 17 | 7th | 1.41   | 1.88 | 2.47 |
| 15 | 8th | 1.60   | 2.13 | 2.80 |
| 13 | 9th | 1.85   | 2.46 | 3.23 |
| 11 | 10th| 2.18   | 2.91 | 3.82 |

(CS labels on left side of table)

FIG. 12

|  |  |  | FC | | |
|---|---|---|---|---|---|
|  |  |  | 24 | 32 | 42 |
|  |  |  | Low | Mid | Top |
| CS | 36 | 1st | 0.67 | 0.89 | 1.17 |
|  | 32 | 2nd | 0.75 | 1.00 | 1.31 |
|  | 28 | 3rd | 0.86 | 1.14 | 1.50 |
|  | 24 | 4th | 1.00 | 1.33 | 1.75 |
|  | 21 | 5th | 1.14 | 1.52 | 2.00 |
|  | 19 | 6th | 1.26 | 1.68 | 2.21 |
|  | 17 | 7th | 1.41 | 1.88 | 2.47 |
|  | 15 | 8th | 1.60 | 2.13 | 2.80 |
|  | 13 | 9th | 1.85 | 2.46 | 3.23 |
|  | 11 | 10th | 2.18 | 2.91 | 3.82 |

FIG. 13

BICYCLE SHIFTING SYSTEM

BACKGROUND

Field of the Invention

This invention generally relates to a bicycle shifting system. More specifically, the present invention relates to a bicycle shifting system that controls a pair of shifting devices.

Background Information

Currently, most bicycle shifting devices are manually operated by a shift operating wire connected between a manual shifting device and a manually operated shift operating device mounted on the handlebar. The rider operates the shift operating device to selectively pull or release the shift operating wire which, in turn, operates a derailleur of the shifting device in the desired manner. More recently, some bicycles have been provided with an electric drive train for smoother and easier shifting. Electric drive trains typically have electric actuators that may be operated manually or automatically. In manually operated electric drive trains, usually, a button or lever on a shift control device mounted to the bicycle handlebar is manipulated so that a gear shift command is output to operate the motor for upshifting or downshifting the bicycle shifting device accordingly. In automatically operated electric drive trains, the gear shift commands are generated automatically based on various running conditions of the bicycle.

SUMMARY

Generally, the present disclosure is directed to various features of a bicycle shifting system having a pair of shifting devices. It has been found that when both of the shifting devices are mechanically operated to perform a synchro-shifting operation, an operating force to simultaneously operate the shifting devices using an operating cable can be quite large. While this problem can be solved using a pair of electrically operated shifting devices, the costs of two electrically operated shifting devices can be significantly more expensive than using mechanically operated shifting devices.

In one feature of the present invention, a bicycle shifting system is provided with a pair of shifting devices in which one of the shifting devices is mechanically operated and the other shifting device is electrically operated.

In view of the state of the known technology and in accordance with a first aspect of the present disclosure, a bicycle shifting system is provided that basically comprises a first shifting device, a second shifting device and a controller. One of the first shifting device and the second shifting device is mechanically operated, while the other of the first shifting device and the second shifting device is electrically operated. The controller is configured to operate at least one of the first shifting device and the second shifting device in accordance with at least one of a predetermined upshifting route and a predetermined downshifting route.

With the bicycle shifting system according to the first aspect, it is possible to reduce the operating force to the other of the first shifting device and the second shifting device.

In accordance with a second aspect of the present invention, the bicycle shifting system according to the first aspect is configured so that the first shifting device is an electrically operated front derailleur, and the second shifting device is a mechanically operated rear derailleur.

With the bicycle shifting system according to the second aspect, s possible to reduce the operating force to operate the front derailleur.

In accordance with a third aspect of the present invention, the bicycle shifting system according to the second aspect further comprises a shift operating device configured to selectively operate both of the first shifting device and the second shifting device.

In accordance with a fourth aspect of the present invention, the bicycle shifting system according to the third aspect is configured so that the shift operating device including a wire takeup member that is configured to be operatively coupled to the second shifting device by an operating cable.

In accordance with a fifth aspect of the present invention, the bicycle shifting system according to the third or fourth aspect is configured so that the shift operating device includes an electrical input device arranged to detect a position of the wire takeup member. The electrical input device is configured to communicate a wire takeup position signal to the controller. The controller controls the first shifting device based on the wire takeup position signal.

In accordance with a sixth aspect of the present invention, the bicycle shifting system according to the fifth aspect is configured so that the electrical input device includes one of a magnetoresistive sensor and a Hall Effect sensor.

In accordance with a seventh aspect of the present invention, the bicycle shifting system according to any one of the third to sixth aspects is configured so that the shift operating device is configured to communicate with the controller via at least one of a power line communication cable, an electrical cable and a wireless communication unit. The controller is configured to communicate with the first shifting device via at least one of a power line communication cable, an electrical cable and a wireless communication unit.

In accordance with an eighth aspect of the present invention, the bicycle shifting system according to any one of the first to seventh aspects is configured so that the controller includes memory with at least one pre-stored shift table including the predetermined upshifting route and the predetermined downshifting route.

In accordance with a ninth aspect of the present invention, the bicycle shifting system according to any one of the first to eighth aspects is configured so that the predetermined upshifting route includes at least one synchro-shift point, and the predetermined downshifting route includes at least one synchro-shift point.

In accordance with a tenth aspect of the present invention, the bicycle shifting system according to the first aspect is configured so that the first shifting device is a mechanically operated front derailleur, and the second shifting device is an electrically operated rear derailleur.

In accordance with an eleventh aspect of the present invention, the bicycle shifting system according to the tenth aspect further comprises a shift operating device configured to selectively operate both of the first shifting device and the second shifting device.

In accordance with a twelfth aspect of the present invention, the bicycle shifting system according to the eleventh aspect is configured so that the shift operating device includes a wire takeup member and an electrical input device. The wire takeup member is configured to be operatively coupled to the first shifting device by an operating cable. The electrical input device is configured to operatively communicate a shift signal to the controller.

In accordance with a thirteenth aspect of the present invention, the bicycle shifting system according to the eleventh or twelfth aspect is configured so that the electrical input device is configured to communicate with the controller via at least one of a power line communication cable, an electrical cable and a wireless communication unit. The controller is configured to communicate with the second shifting device via at least one of a power line communication cable, an electrical cable and a wireless communication unit.

In accordance with a fourteenth aspect of the present invention, the bicycle shifting system according to the first aspect is configured so that the second shifting device is mechanically connected to the first shifting device, and the first shifting device includes an electric motor that mechanically operates the second shifting device.

In accordance with a fifteenth aspect of the present invention, the bicycle shifting system according to the fourteenth aspect is configured so that the first shifting device is an electrically operated front derailleur, and the second shifting device is a mechanically operated rear derailleur.

With the bicycle shifting system according to the fifteenth aspect, it is possible to reduce the operating force to operate the front derailleur because the front derailleur is electrically operated.

In accordance with a sixteenth aspect of the present invention, the bicycle shifting system according to the fourteenth or fifteenth aspect is configured so that the shift operating device includes an electrical input device that is configured to communicate a shift signal to the controller.

In accordance with a seventeenth aspect of the present invention, the bicycle shifting system according to the sixteenth aspect is configured so that the electrical input device is configured to communicate with the controller via at least one of a power line communication cable, an electrical cable and a wireless communication unit. The controller is configured to communicate with the first shifting device via at least one of a power line communication cable, an electrical cable and a wireless communication unit.

In accordance with an eighteenth aspect of the present invention, the bicycle shifting system according to the first aspect is configured so that the first shifting device is mechanically connected to the second shifting device, and the second shifting device includes an electric motor that mechanically operates the first shifting device.

In accordance with a nineteenth aspect of the present invention, the bicycle shifting system according to the eighteenth aspect is configured so that the first shifting device is a mechanically operated front derailleur, and the second shifting device is an electrically operated rear derailleur.

In accordance with a twentieth aspect of the present invention, the bicycle shifting system according to the eighteenth or nineteenth aspect is configured so that the shift operating device includes an electrical input device configured to communicate a shift signal to the controller.

In accordance with a twenty-first aspect of the present invention, the bicycle shifting system according to the twentieth aspect is configured so that the electrical input device is configured to communicate with the controller via at least one of a power line communication cable, an electrical cable and a wireless communication unit. The controller is configured to communicate with the second shifting device via at least one of a power line communication cable, an electrical cable and a wireless communication unit.

In accordance with a twenty-second aspect of the present invention, a bicycle shifting system is provided that basically comprises a first shifting device, a second shifting device and a controller. One of the first shifting device and the second shifting device is mechanically operated, while the other of the first shifting device and the second shifting device is electrically operated by an electrical motor. The electrical motor is configured to mechanically operate the one of the first shifting device and the second shifting device.

With the bicycle shifting system according to the twenty-second aspect, it is possible to reduce the operating force to the other of the first shifting device and the second shifting device.

In accordance with a twenty-third aspect of the present invention, a shift operating device is provided that basically comprises a mechanical shifting unit and an electrical shifting unit. The mechanical shifting unit is configured to mechanically operate one of a first shifting device and a second shifting device. The electrical shifting unit is configured to electrically operate the other of first shifting device and a second shifting device.

With the bicycle shifting system according to the twenty-third aspect, it is possible to reduce the operating force to the other of the first shifting device and the second shifting device.

In accordance with a twenty-fourth aspect of the present invention, the bicycle shifting system according to the twenty-third aspect is configured so that the mechanical shifting unit includes a wire takeup member that is configured to be operatively coupled to the one of the first shifting device and the second shifting device by an operating cable.

In accordance with a twenty-fifth aspect of the present invention, the bicycle shifting system according to the twenty-third or twenty-fourth aspect is configured so that the electrical shifting unit includes an electrical input device that is configured to communicate a shift signal to a controller that is configured to operate at least one of the first shifting device and the second shifting device.

In accordance with a twenty-sixth aspect of the present invention, the bicycle shifting system according to the second aspect further comprises a shift operating device configured to operate the second shifting device.

In accordance with a twenty-seventh aspect of the present invention, the bicycle shifting system according to the twenty-sixth aspect is configured so that the shift operating device includes a wire takeup member that is configured to be operatively coupled to the second shifting device by an operating cable, and the second shifting device includes an electrical input device that is configured to operatively communicate a shift signal to the controller.

In accordance with a twenty-eighth aspect of the present invention, the bicycle shifting system according to the twenty-seventh aspect is configured so that the electrical input device is configured to communicate with the controller via at least one of a power line communication cable, an electrical cable and a wireless communication unit, and the controller is configured to communicate with the first shifting device via at least one of a power line communication cable, an electrical cable and a wireless communication unit.

Also other objects, features, aspects and advantages of the disclosed bicycle shifting system will become apparent to those skilled in the art from the following detailed description, which, taken in conjunction with the annexed drawings, discloses various illustrative embodiments of the bicycle shifting system.

BRIEF DESCRIPTION OF THE DRAWINGS

Referring now to the attached drawings which form a part of this original disclosure:

FIG. 11 is a third synchro-shift gear shift table that is selectively used by anyone of the bicycle shift systems in accordance with the third and fourth embodiments when used with a bicycle having two front sprockets and ten rear sprockets;

FIG. 12 is a fourth synchro-shift gear shift table that is selectively used by anyone of the bicycle shift systems in accordance with the third and fourth embodiments when used with a bicycle having three front sprockets and ten rear sprockets;

FIG. 13 is a fifth synchro-shift gear shift table that is selectively used by anyone of the bicycle shift systems in accordance with the third and fourth embodiments when used with a bicycle having three front sprockets and ten rear sprockets.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
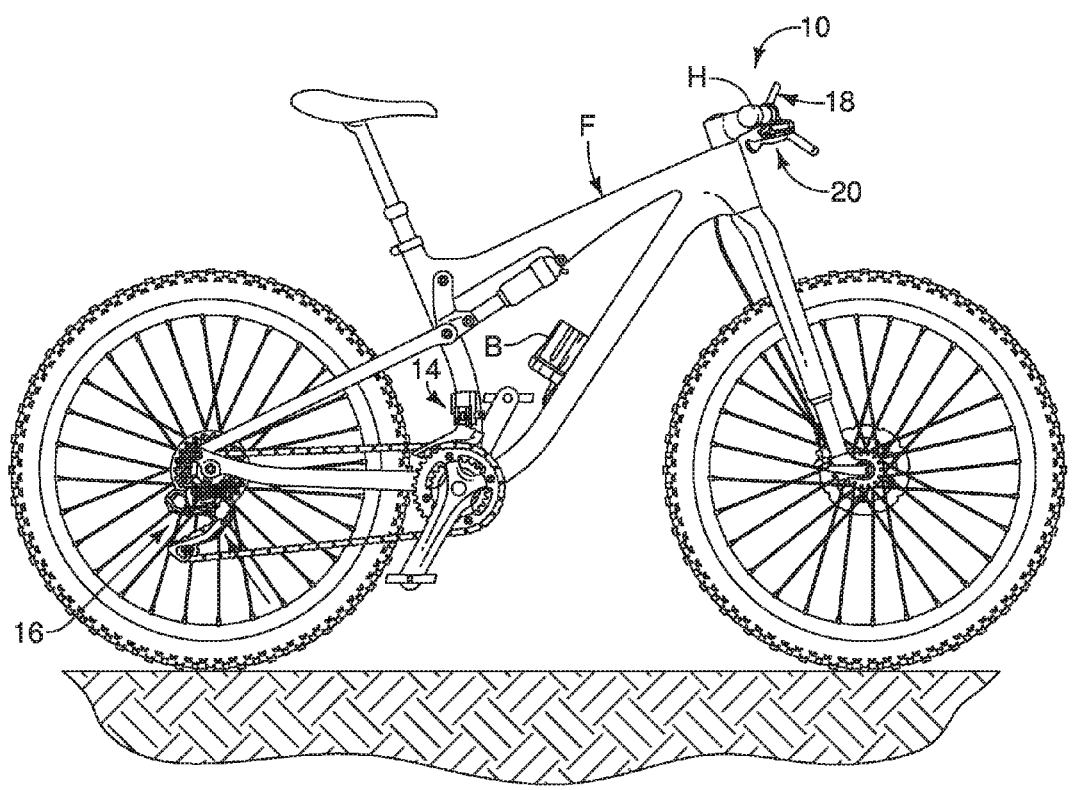
FIG. 1 is a side elevational view of a bicycle that is equipped with a bicycle shifting system in accordance with a first embodiment.

Referring initially to FIG. 1, a bicycle 10 is illustrated that is equipped with a bicycle shifting system 12 in accordance with a first embodiment. While the bicycle 10 is illustrated as a mountain bike, the bicycle shifting system 12 is not limited to use with a road bike. For example, this invention can also be applied to road bikes or any type of bicycle. As seen in FIG. 1, the bicycle shifting system 12 is a part of an electrical control system of the bicycle 10.

Figure 2:
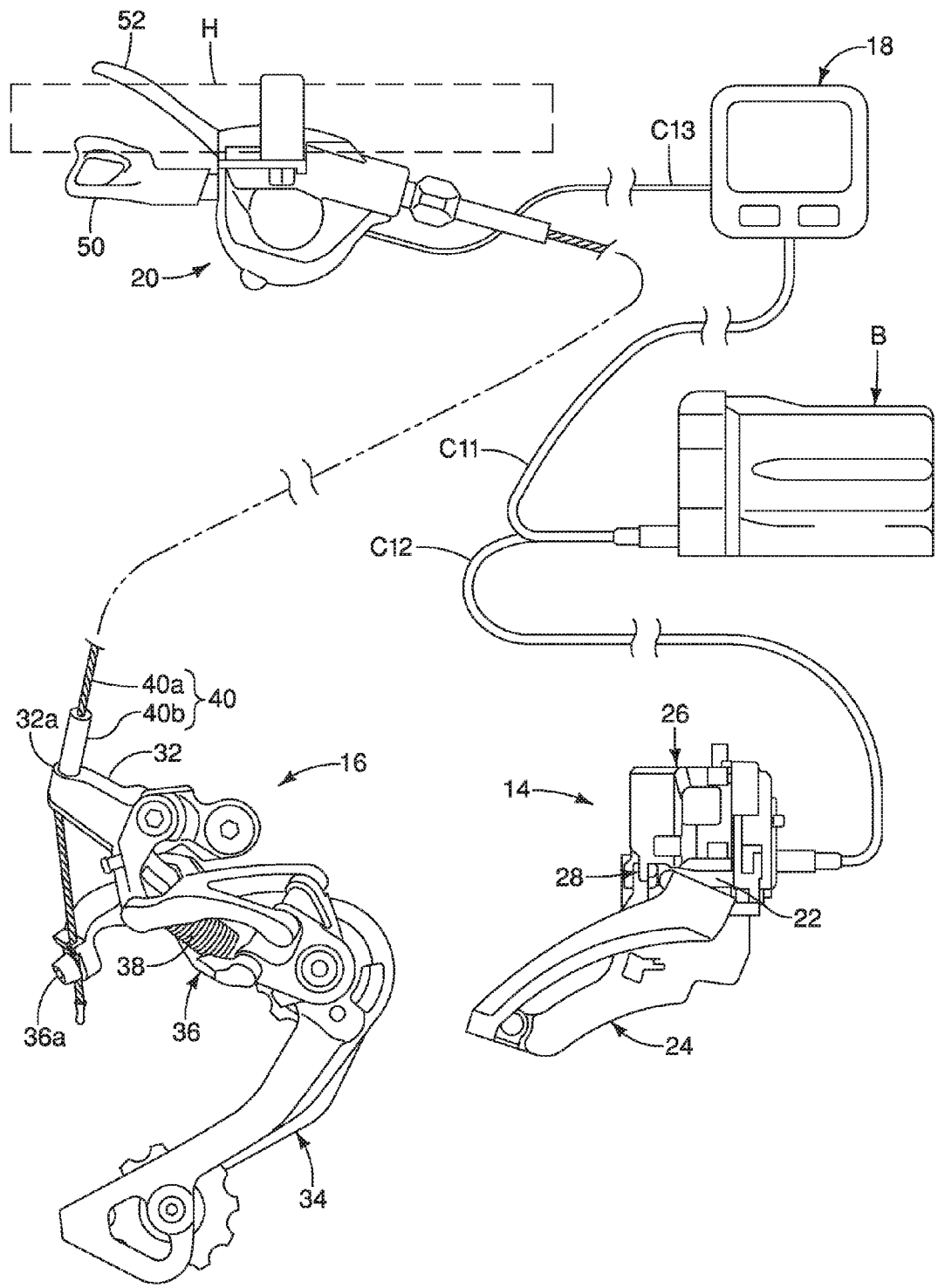
FIG. 2 is a component diagram of the bicycle shifting system of the first embodiment.
Figure 4:
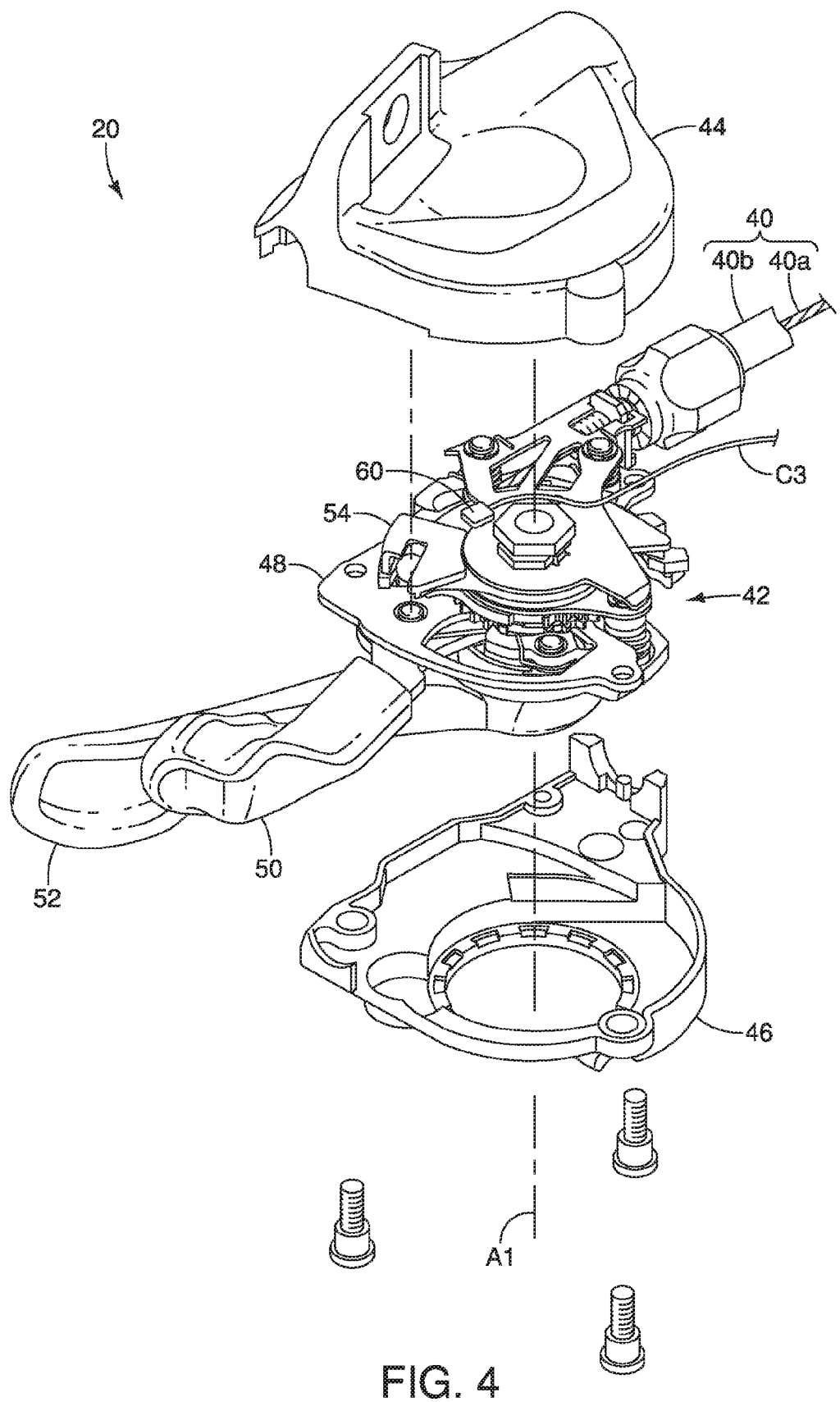
FIG. 4 is a partially exploded perspective view of the shift operating device for the bicycle shifting system in accordance with the first embodiment.

As seen in FIGS. 1, 2 and 4, the bicycle shifting system 12 basically comprises a first shifting device 14, a second shifting device 16 and a controller 18. As seen in FIG. 1, the bicycle 10 has a bicycle frame F and a handlebar H. The first and second shifting devices 14 and 16 are mounted to the bicycle frame F, while the controller 18 is mounted to the handlebar H. The bicycle shifting system 12 further comprises a shift operating device 20 that is configured to selectively operate both of the first shifting device 14 and the second shifting device 16. The shift operating device 20 is mounted to the handlebar H. Basically, in the first embodiment, the shift operating device 20 is configured to electrically operate the first shifting device 14 via the controller 18, and mechanically operate the second shifting device 16.

As seen in FIGS. 1 and 2, the bicycle shifting system 12 comprises a battery B that supplies electrical power to the first shifting device 14 and the controller 18 of the bicycle shifting system 12. The battery B also supplies electrical power to other electrical components of the bicycle 10 as needed and/or desired. The battery B is electrically connected to the controller 18 by an electrical cable C11 to supply electrical power to the controller 18. The battery B is electrically connected to the first shifting device 14 by an electrical cable C12 to supply electrical power to the first shifting device 14. In the first embodiment, the electrical cables C11 and C12 also transmits data using power line communications (PLC). Thus, the first shifting device 14 and the controller 18 are each provided with a PLC (Power Line communication) circuit board for transmitting shift signals and/or commands from the controller 18 to the first shifting device 14 for upshifting and downshifting the first shifting device 14. As explained below, the controller 18 determines when to upshift and downshift the first shifting device 14 based on prestored programs, traveling parameters and/or the shifting of the second shifting device 16 using the shift operating device 20. Here, the controller 18 is electrically connected to the shift operating device 20 by an electrical cable C13 to receive shift signals from the shift operating device 20 to indicate the current gearshift position of the second shifting device 16.

In the first embodiment, broadly speaking, one of the first shifting device 14 and the second shifting device 16 is mechanically operated, and the other of the first shifting device 14 and the second shifting device 16 is electrically operated. More specifically, in the first embodiment, the first shifting device 14 is an electrically operated front derailleur, and the second shifting device 16 is a mechanically operated rear derailleur. Hereinafter, the first shifting device 14 will be also referred to as the front derailleur 14, and the second shifting device 16 will be also referred to as the rear derailleur 16. In the first embodiment, for example, the front derailleur 14 is a motorized front derailleur, and the rear derailleur 16 is a cable operated rear derailleur. Since motorized front derailleurs and cable operated rear derailleurs are well known in the bicycle field, the electrically operated front derailleur 14 and the mechanically operated rear derailleur 16 will not be discussed in detail herein.

However, it will be apparent from this disclosure that the bicycle shifting system 12 is not limited to use with cable operated rear derailleurs. Rather, the rear derailleur 16 can be a hydraulically operated rear derailleur. In other words, the term "mechanically operated" as used herein means "non-electrically operated" such as cable operated, hydraulically operated, pneumatically operated, etc.

Moreover, the "shifting devices" of the bicycle shifting system 12 can be other types of speed changing devices such as, but not limited to, an internal geared shifting device and a gear box. In any case, with the arrangement of the first embodiment, it is possible to reduce the operating force of the shift operating device 20 to operate the front derailleur 14 because the front derailleur 14 is electrically operated. In particular, the operating force of the shift operating device 20 is only limited to the operating force required to operate the rear derailleur 16.

Figure 3:
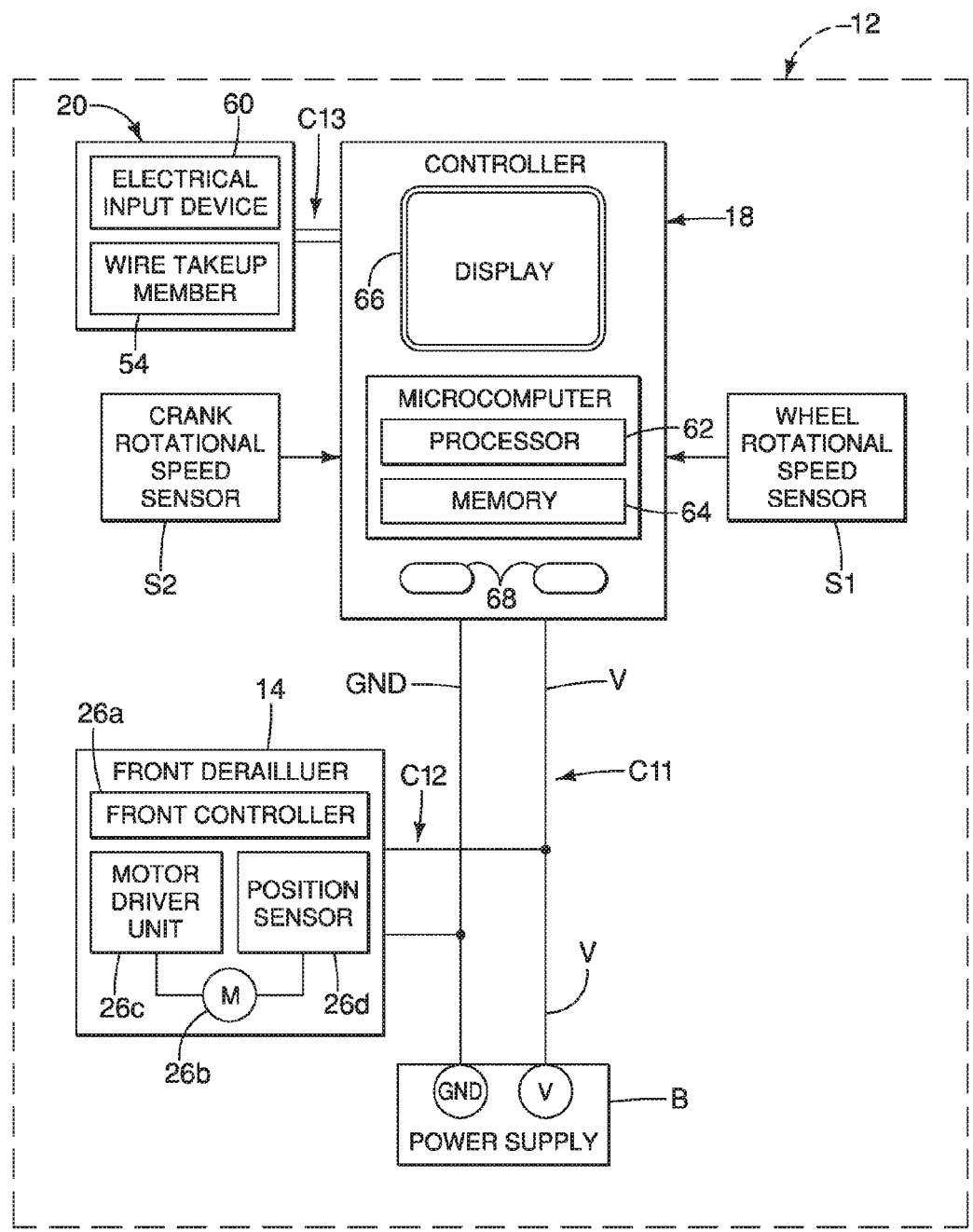
FIG. 3 is a schematic block diagram showing an overall configuration of the bicycle shifting system including the bicycle gear changing apparatus in accordance with the first embodiment illustrated in FIGS. 1 and 2.

Basically, as seen in FIG. 2, the front derailleur 14 includes a base 22, a chain guide 24 and an actuator unit 26. The base 22 is configured to be mounted on to the frame of the bicycle 10 in a conventional manner. The chain guide 24 is movably coupled to the base 22 by a linkage 28, which includes two links that form a four-bar linkage between the base 22 and the chain guide 24. The actuator unit 26 is disposed on the base 22. The actuator unit 26 is operatively connected to the linkage 28 to move the chain guide 24 between an extended position and a retracted position. As seen in FIG. 3, the actuator unit 26 includes a front controller 26*a*, a motor 26*b*, a motor driver unit 26*c* and a position sensor 26*d*. The front controller 26*a* is configured and arranged to control the motor driver unit 26*c* in response to a shift control signal from operation of the shift operating device 20 as discussed below. The motor 26*b* is configured and arranged to drive the linkage 28 to move the chain guide 24 between the extended position and the retracted position. The motor driver unit 26*c* is configured and arranged to drive the motor 26*b*. The position sensor 26*d* is configured and arranged to sense the gearshift position of the chain guide 24. While a potentiometer can be used for the position sensor 26*d* such as disclosed in U.S. Pat. No. 7,306,531, the position sensor 26*d* is not limited to such a construction.

Basically, as seen in FIG. 2, the rear derailleur 16 includes a base 32, a chain guide 34 and a linkage 36. Preferably, the rear derailleur 16 further includes a biasing member 38 for biasing the chain guide 34 towards a retracted position in which the chain guide 34 is aligned with the largest rear sprocket. The base 32 is configured to be mounted on to the frame of the bicycle 10 in a conventional manner. The chain guide 34 is movably coupled to the base 32 by the linkage 36, which includes two links that form a four-bar linkage between the base 32 and the chain guide 34. The rear derailleur 16 is operatively coupled to the shift operating device 20 by an operating cable 40. The operating cable 40 is a conventional bicycle operating cable that has an inner wire 40*a* slidably disposed inside an outer case 40*b*. In other words, the operating cable 40 is a Bowden type cable in which the inner wire 40*a* is slidably received within the outer case 40*b*. The shift operating device 20 operates the rear derailleur 16 by selectively pulling and releasing the inner wire 40*a*. In this way, operation of the operating cable 40 causes the chain guide 34 to move with respect to the base 32. Here, the base 32 has an outer case holder 32*a* in which an end of the outer case 40*b* of the operating cable 40 is held. The inner link of the linkage 36 includes a wire attachment member 36*a* to which the inner wire 40*a* is fixed.

Now, the shift operating device 20 will be discussed in more detail referring mainly to FIG. 4. However, since the shift operating device 20 is relatively conventional, the shift operating device 20 will only be briefly discussed herein to understand the present invention. The shift operating device 20 includes a cable position maintaining mechanism 42 for selectively pulling and releasing the inner wire 40*a* to establish a predetermined shift positions. Here, the cable position maintaining mechanism 42 has ten predetermined shift positions. The cable position maintaining mechanism 42 is contained within a housing that includes a first or upper housing part 44 and a second or lower housing part 46. The housing parts 44 and 46 are hard rigid members constructed of a suitable material such as a hard plastic or a lightweight metal. The housing parts 44 and 46 are fastened together by three screws. However, the housing can have a variety of configurations as needed and/or desired. As seen in FIG. 2, the upper housing part 44 is attached to the handlebar H in a conventional manner.

As seen in FIG. 4, the shift operating device 20 further comprises an internal support structure 48 that basically supports various internal parts of the cable position maintaining mechanism 42. In particular, the shift operating device 20 further comprises a first operating member 50 and a second operating member 52 that are supported by the internal support structure 48. As seen in FIG. 4, the shift operating device 20 includes a wire takeup member 54 that is configured to be operatively coupled to the second shifting device 16 by the operating cable 40. Here, the wire takeup member 54 is rotatably supported by the internal support structure 48 to rotate about an operating axis A1. One end of the inner wire 40*a* is attached to the wire takeup member 54 as seen in FIG. 4, while the other end of the inner wire 40*a* is attached to the linkage 36 of the rear derailleur 16. The first operating member 50 is used to release the inner wire 40*a* from the housing. The first operating member 50 is movably arranged to move from a first rest position to a first actuated position. The second operating member 52 is used to pull the inner wire 40*a* into the housing of the shift operating device 20. The second operating member 52 is movably arranged to move from a second rest position to a second actuated position. The first and second operating members 50 and 52 are configured as trigger levers that are biased towards the first and second rest positions, respectively, as shown in FIG. 4. The maintaining mechanism 42 includes various ratchet plates and pawls that are operated in response to the movements of first and second operating members 50 and 52 to selectively release and pull the inner wire 40*a*. Thus, the cable position maintaining mechanism 42 is operated by the first and second operating members 50 and 52 to release and pull the inner wire 40*a* from the housing of the shift operating device 20 in response to operation of the first and second operating members 50 and 52 as discussed below. The cable position maintaining mechanism 42 together with the first and second operating members 50 and 52 constitutes a main operating unit of the shift operating device 20.

Since the biasing member 38 biases the chain guide 34 towards the retracted position in which the chain guide 34 is aligned with the largest rear sprocket, the first operating member 50 is used to move the chain guide 34 from a smaller rear sprocket to a larger rear sprocket. On the other hand, the second operating member 52 is used to move the chain guide 34 from a larger rear sprocket to a smaller rear sprocket.

As seen in FIG. 4, the shift operating device 20 further includes an electrical input device 60 that is arranged to detect a position of the wire takeup member 54. The electrical input device 60 is configured to communicate a wire takeup position signal to the controller 18. The electrical input device 60 includes one of a magnetoresistive (MR) sensor and a Hall Effect sensor. The wire takeup member 54 is provided with one or more magnets (not shown) so that the electrical input device 60 can measure the strength of the magnetic field of the one or more magnets on the wire takeup member 54. The shift operating device 20 is configured to communicate with the controller 18 via the electrical cable C13. In the first embodiment, the electrical input device 60 is configured to communicate a shift signal to the controller 18 that is configured to operate the second shifting device 16. More broadly speaking, the shift operating device 20 includes an electrical input device 60 that is configured to communicate a shift signal to the controller 18 that is configured to operate at least one of the first shifting device 14 and the second shifting device 16. In this way, the shift operating device 20 comprises a mechanical shifting unit and an electrical shifting unit. The mechanical shifting unit (i.e., the maintaining mechanism 42 in the first embodiment) is configured to mechanically operate one of the first shifting device 14 and the second shilling device 16 (i.e., the second shifting device 16 in the first embodiment). The electrical shifting unit (i.e., the maintaining mechanism 42 in the first embodiment) is configured to electrically operate the other of first shifting device 14 and a second shifting device 16. More specifically, the mechanical shifting unit (i.e., the maintaining mechanism 42 in the first embodiment) includes the wire takeup member 54 that is configured to be operatively coupled to the second shifting device 16 by the operating cable 40.

By using the electrical input device 60, the controller 18 detects the current gearshift position of the chain guide 34 of the rear derailleur 16 (i.e., the second shifting device) without having to provide a position sensor on the rear derailleur 16. Alternatively, a position sensor can be provided on the rear derailleur 16 to provide the current gearshift position of the chain guide 34 to the controller 18. Also it will be apparent from this disclosure that the shift operating device 20 can be configured to communicate with the controller 18 via a power line communication cable or a wireless communication unit.

Now, the controller 18 will be discussed in more detail referring mainly to FIG. 3. Here, in the first embodiment the controller 18 is a cycle computer that also functions to provide the ride with various operating conditions of the bicycle 10 in addition to acting as a signal controller that outputs control signals for changing gears of the bicycle 10 in response to operation of the shift operating device 20. While the controller 18 is electrical connected to the other parts of the bicycle shifting system 12 as schematically illustrated in FIG. 3, it will be apparent from this disclosure that wireless communication may be used to operatively couple the controller 18 to other parts of the bicycle shifting system 12 for receiving data. The controller 18 interprets and executes instructions (data, signals and commands) of the various programs and hardware to direct the operation of the bicycle shifting system 12. While the controller 18 is illustrated as a single separate unit, the controller 18 could be part of another component or could be a part of several components (e.g., multiple controllers located in different parts). For example, the controller 18 can be either part of the shift operating device 20 or part of the front derailleur 14.

As seen in FIG. 3, the controller 18 includes a processor 62 for processing the various signals from the various sensors and components of the bicycle shifting system 12. The controller 18 includes memory 64 having stored therein a shift control program that controls the movement of the first shifting device 14. The memory 64 includes a ROM (Read Only Memory) device and a RAM (Random Access Memory) device. Basically, the controller 18 is configured to operate at least one of the first shifting device 14 and the second shifting device 16 in accordance with at least one of a predetermined upshifting route and a predetermined downshifting route. In the first embodiment, the first shifting device 14 is controlled by the controller 18 based on the current gearshift position of the chain guide 34. More specifically, in the first embodiment, the controller 18 controls the first shifting device 14 based on the wire takeup position signal outputted by the electrical input device (position sensor) 60 to the controller 18.

In the first embodiment, the memory 64 at least one pre-stored shift table (see FIGS. 6 and 7) including the predetermined upshifting route and the predetermined downshifting route, which are used by the processor 62 of the controller 18 to move the front derailleur 14. The predetermined upshifting route includes at least one synchro-shift point. The predetermined downshifting route includes at least one synchro-shift point.

The controller 18 has a display 66 for displaying gear positions, speed, traveled distance and other information to the rider as in the case of most cycling computers. Also in the illustrated embodiment, the controller 18 further includes an input button 68 to modify various operating parameters of the bicycle shifting system 12. The controller 18 also preferably includes a communication port such as a USB port for attaching a computer to update software and/or modify various operating parameters of the bicycle shifting system 12.

Figures 5, 6:
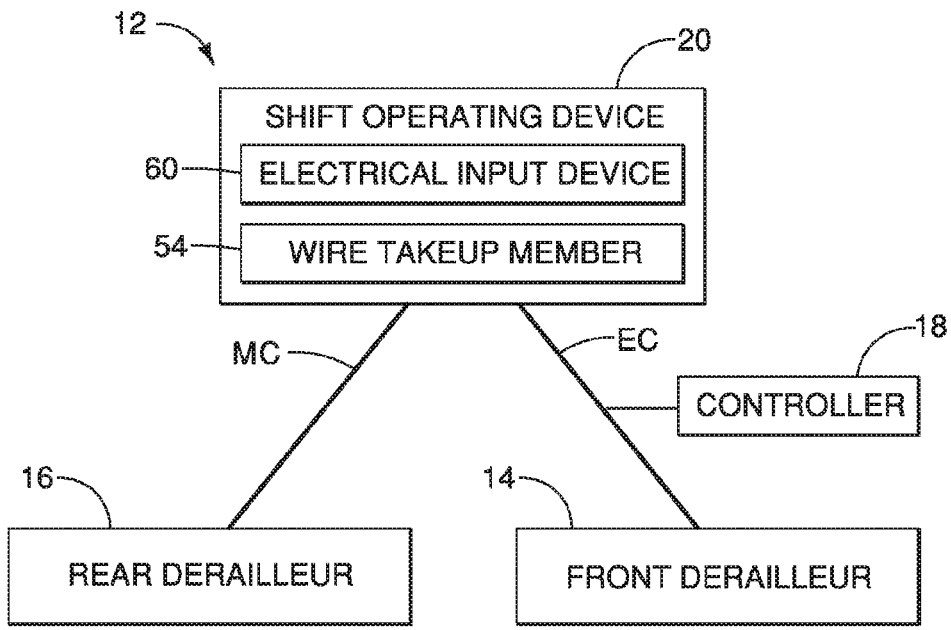
FIG. 5 is a block component diagram of the bicycle shifting system of the first embodiment in which the bicycle shifting system includes a shift operating device, an electrically operated front derailleur as a first shifting device and a mechanically operated rear derailleur as a second shifting device, wherein the shift operating device operates both the first and second shifting devices.
FIG. 6 is a first synchro-shift gear shift table for the bicycle shift system of the first embodiment that is used with a bicycle having two front sprockets and ten rear sprockets.
Figures 7, 8:
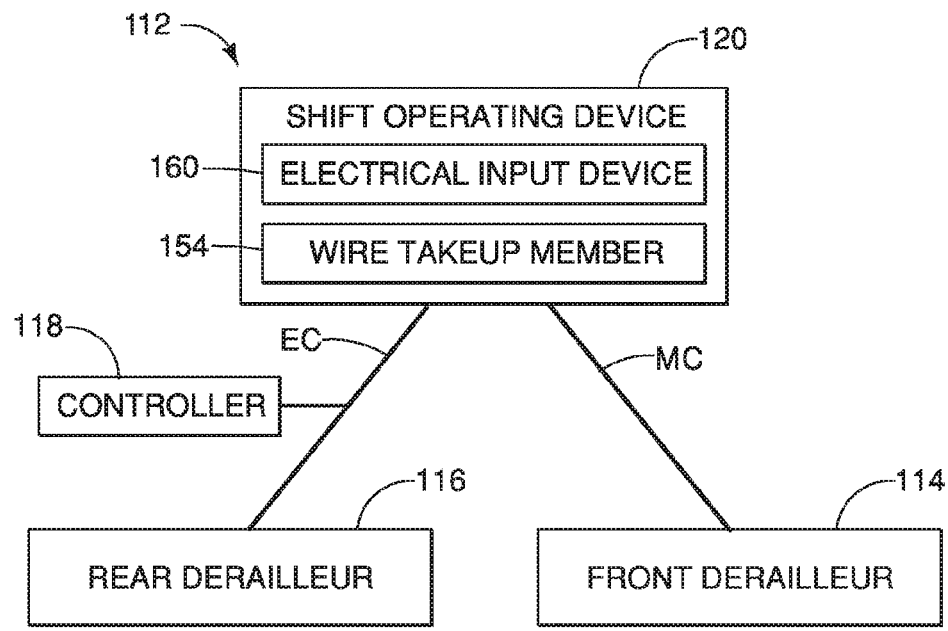
FIG. 7 is a second synchro-shift gear shift table for the bicycle shift system of the first embodiment that is used with a bicycle having three front sprockets and ten rear sprockets.
FIG. 8 is a block component diagram of a bicycle shifting system in accordance with a second embodiment in which the bicycle shifting system includes a shift operating device, a mechanically operated front derailleur as a first shifting device and an electrically operated rear derailleur as a second shifting device, wherein the shift operating device operates both the first and second shifting devices.

In the first embodiment, the controller 18 has a plurality of pre-stored shift tables (see FIGS. 6 and 7). The prestored shift tables are stored in the memory 64 such that the controller 18 operates the front derailleur 14 in response to signals from the electrical input device 60 that detects movement of the wire takeup member 54. FIG. 6 is an example of a first synchro-shift gear shift table for the bicycle shift system 12 of the first embodiment that is used with the bicycle 10 having two front sprockets and ten rear sprockets. When the controller 18 is set by the user to use the first synchro-shift gear shift table, the front and rear derailleurs 14 and 16 can establish eighteen speed stages while in the synchro-shift mode. FIG. 7 is a second synchro-shift gear shift table for the bicycle shift system 12 of the first embodiment that is used with a bicycle having three front sprockets and ten rear sprockets. When the controller 18 is set by the user to use the second synchro-shift gear shift table, the front and rear derailleurs 14 and 16 can establish twenty one speed stages with the synchro-shift mode. In this disclosure, a high gear ratio refers to a higher bicycle speed per rotation of the crank arms, while a low gear ratio refers to a lower bicycle speed per rotation of the crank arms.

While only two pre-stored shift tables (see FIGS. 6 and 7) are illustrated as being stored in the memory 64, it will be apparent firm this disclosure that more than two pre-stored shift tables can be stored in the memory 64. The user can select which pre-stored shift tables are used based on the drive train configuration of the bicycle. Also the controller 18 can be programmed to select different pre-stored shift tables with different synchro-shift points based on various traveling conditions of the bicycle 10 as detected by sensors such as a wheel rotational speed sensor S1 and a crank rotational speed sensor S2. In this way, the controller 18 can select the best-stored shift tables for the drive train configuration of the bicycle based on the various traveling conditions of the bicycle 10. Of course, the rider can override this automatic shift table selection and manually set a desired shift table.

In the first synchro-shift gear shift table of FIG. 6, the predetermined upshifting route includes one synchro-shift point, and the predetermined downshifting route includes one synchro-shift point. However, the bicycle shifting device is not limited to a single synchro-shift point of the bicycle shifting device. The locations and numbers of synchro-shift points will depend on the particular gear ratios that can be attained in the particular bicycle shifting device. In other words, the tooth count can be changed for the rear sprockets and the front sprockets to change the gear ratios, which can be attained such that more or less rear sprockets and/or front sprockets can be changed for increasing or decreasing the attainable number of speed stages.

The rider upshifts by operating the first operating member 50, which move the chain guide 34 from a larger rear sprocket to a smaller rear sprocket. The rider downshifts by operating the second operating member 52, which move the chain guide 34 from a smaller rear sprocket to a larger rear sprocket. Thus, while in the synchro-shift mode using the first synchro-shift gear shift table of FIG. 6, the movement of the first operating member 50 causes the movement of the chain guide 34 of the rear derailleur 16 (i.e., the second shifting device).

As seen in FIG. 3, the bicycle shifting system 12 includes the power supply B. The bicycle shifting system 12 is configured to supply electric power from the power supply B to at least one of the first shifting device 14, the second shifting device 16, the controller 18, the shift operating device 20, the wheel rotational speed sensor S1, and the crank rotational speed sensor S2. The electrical input device 60 is operated by the electrical power supplied by the power supply B. The actuator unit 26 is operated by the electrical power supplied by the power supply B. The power supply B includes at least one of a primary cell, a secondary cell, a fuel cell, and an electrical generator (e.g. a dynamo hub). In the first embodiment, the power supply B is mounted to the bicycle frame F independently with other electrical device. However, the power supply B can be embedded in the at least one of the first shifting device 14, the second shifting device 16, the controller 18 and the shift operating device 20.

Referring to FIG. 5, a block component diagram of the bicycle shifting system 12 is illustrated in accordance with the first embodiment. The shift operating device 20 is configured to connect to the second shifting device 16 via a mechanical connection MC which comprises the operating cable 40. The shift operating device 20 is configured to communicate with the controller 18 via a non-mechanical connection EC which comprises at least one of a power line communication cable, an electrical cable and a wireless communication unit. The controller 18 is configured to communicate with the first shifting device 14 via a non-mechanical connection EC which comprises at least one of a power line communication cable, an electrical cable and a wireless communication unit. Accordingly, the bicycle shifting system 12 in accordance with the first embodiment is not limited to the use of the power line communication cables C11 and C12 and the electrical cable C13 of FIG. 3. Rather, instead of the PLC (Power Line communication) circuit board being provided to the first shifting device 14 and the controller 18, it will be apparent from this disclosure that the first shifting device 14, the controller 18 and the shift operating device 20 can have a wireless communication unit that wirelessly transmitting shift signals and/or commands between the controller 18, the first shifting device 14 and the shift operating device 20 for upshifting and downshifting the first shifting device 14. Likewise, dedicated data signal lines can be provided between the first shifting device 14, the controller 18 and the shift operating device 20 to transmit shift signals and/or commands for upshifting and downshifting the first shifting device 14.

Referring to FIG. 8, a block component diagram of a bicycle shifting system 112 is illustrated in accordance with a second embodiment. Here, the bicycle shifting system 112 basically comprises a first shifting device 114, a second shifting device 116 and controller 118. The first shifting device 114 is a mechanically operated front derailleur, and the second shifting device 116 is an electrically operated rear derailleur. The bicycle shifting system 112 further comprises a shift operating device 120 that is configured to selectively operate both of the first shifting device 114 and the second shifting device 116. Hereinafter, the first shifting device 114 will be also referred to as the front derailleur 114, and the second shifting device 116 will be also referred to as the rear derailleur 116. Basically, the bicycle shifting system 112 is a modification of the bicycle shifting system 12, discussed above.

The shift operating device 120 includes a wire takeup member 154 and an electrical input device 160. The wire takeup member 154 is configured to be operatively coupled to the first shifting device 114 by an operating cable included in a mechanical connection MC. The electrical input device 160 is configured to operatively communicate a shift signal to the controller 118 for operating an electric motor of the rear derailleur 116. The mechanical shifting unit of the shift operating device 120 is basically the same as the mechanical shifting unit of the shift operating device 20, but configured to have fewer predetermined shift positions (e.g., typically two or three predetermined shift positions). The electrical input device 160 the electrical shifting unit) of the shift operating device 120 includes a manual input member (e.g., a button or a lever) that the rider manually operates to activate a switch for shifting the rear derailleur 116.

The electrical input device 160 is configured to communicate with the controller 118 via a non-mechanical connection EC which comprises at least one of a power line communication cable, an electrical cable and a wireless communication unit. The controller 118 is configured to communicate with the second shifting device 116 via a non-mechanical connection EC which comprises at least one of a power line communication cable, an electrical cable and a wireless communication unit. Since power line communication cables, electrical cables and wireless communication units are all well known, these non-mechanical connections are diagrammatically illustrated.

Figure 9:
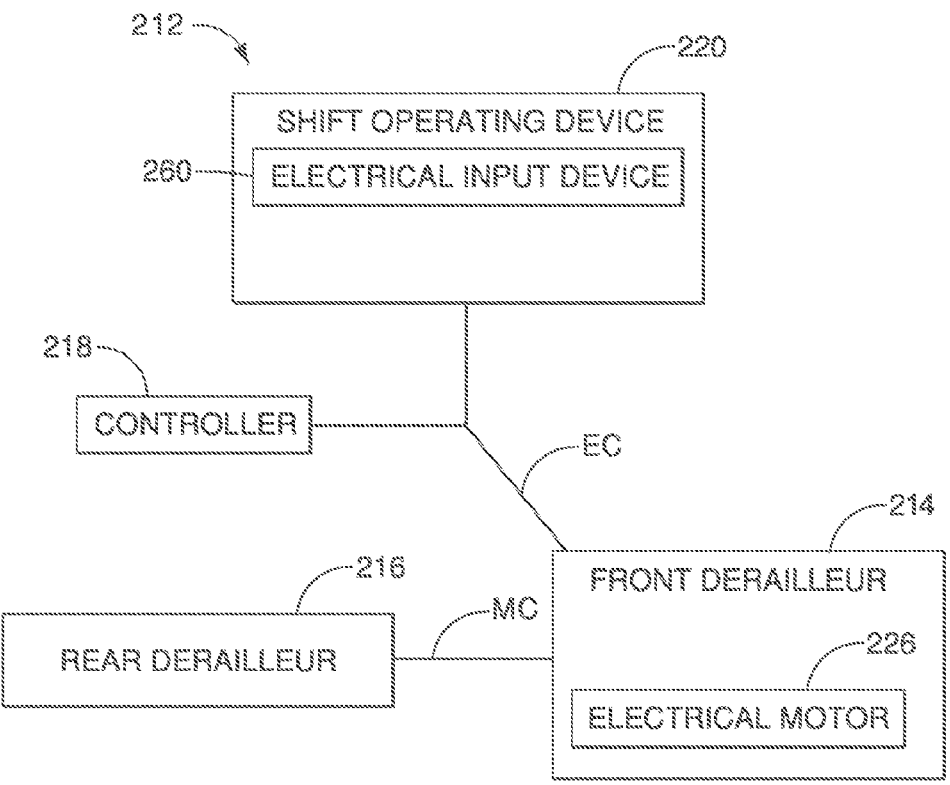
FIG. 9 is a block component diagram of a bicycle shifting system in accordance with a third embodiment in which the bicycle shifting system includes a shift operating device, an electrically operated front derailleur as a first shifting device that is operated by the shift operating device and a mechanically operated rear derailleur as a second shifting device, wherein the shift operating device operates the first shifting device that has an electric motor which operates the mechanically operated rear derailleur.

Referring to FIG. 9 is a block component diagram of a bicycle shifting system 212 is illustrated in accordance with a third embodiment. Here, the bicycle shifting system 212 basically comprises a first shifting device 214, a second shifting device 216 and a controller 218. The second shifting device 216 is mechanically connected to the first shifting device 214. The first shifting device 214 includes an electric motor 226 that mechanically operates the second shifting device 216. The first shifting device 214 is an electrically operated front derailleur, and the second shifting device 216 is a mechanically operated rear derailleur. Hereinafter, the first shifting device 214 will be also referred to as the front derailleur 214, and the second shifting device 216 will be also referred to as the rear derailleur 216.

Similar to the first embodiment, the controller 218 includes a processor for processing the various signals from the various sensors and components of the bicycle shifting system 212. The controller 218 further includes memory that has a shift control program can be stored therein. The memory includes a ROM (Read Only Memory) device and a RAM (Random Access Memory) device. Basically, the controller 218 is configured to operate the first shifting device 214 and the second shifting device 216 in accordance with at least one of a predetermined upshifting route and a predetermined downshifting route. In the third embodiment, the first shifting device 214 is controlled by the controller 218 based on the current gearshift position of the chain guide of the second shifting device 216. In the third embodiment, the memory has pre-stored shift tables such as the synchro-shift gear shift tables of FIGS. 11 to 13. The synchro-shift gear shift tables of FIGS. 11 to 13 are discussed in more detail in U.S. Pat. No. 9,151,379. Theses synchro-shift gear shift tables of FIGS. 11 to 13 include predetermined upshifting routes and predetermined downshifting routes, which are used by the processor of the controller 218 to move the front and rear derailleurs 214 and 216. The predetermined upshifting routes of the synchro-shift gear shift tables of FIGS. 11 to 13 include at least one synchro-shift point. The predetermined downshifting routes of the synchro-shift gear shift tables of FIGS. 11 to 13 include at least one synchro-shift point.

Basically, the shift operating device 220 includes an electrical input device 260 that is cord to communicate a shift signal to the controller 218. More specifically, the shift operating device 220 includes one or more manual input members (e.g., a button or a lever) that the rider manually operates to activate one or more switches for outputting shift signals to the controller 218. These shift signals are received by the controller 218, which can be mounted on the front derailleur 214 to selectively operate the electric motor 226. The electrical input device 260 is configured to communicate with the controller 218 via a non-mechanical connection EC which comprises at least one of a power line communication cable, an electrical cable and a wireless communication unit. The controller 218 is configured to communicate with the first shifting device 214 via a non-mechanical connection EC which comprises at least one of a power line communication cable, an electrical cable and a wireless communication unit.

The electric motor 226 selectively moves one or both of the chain guides of the front and rear derailleurs 214 and 216 by selectively operating electric clutches. Alternatively, the front derailleur 214 can be provided with a first electric motor for selectively moving the chain guide of the front derailleur 214 similar to the first embodiment, and a second electric motor for selectively moving the chain guide of the rear derailleur 216. In any case, an electric motor of the front derailleur 214 drives an operating cable included in a mechanical connection MC to move the chain guide of the rear derailleur 216. For example, the "control means" and the "operating means" disclosed in U.S. Patent Application Publication No. 2014/0179470 can be adapted to an electric motor provided to the front derailleur 214.

Figure 10:
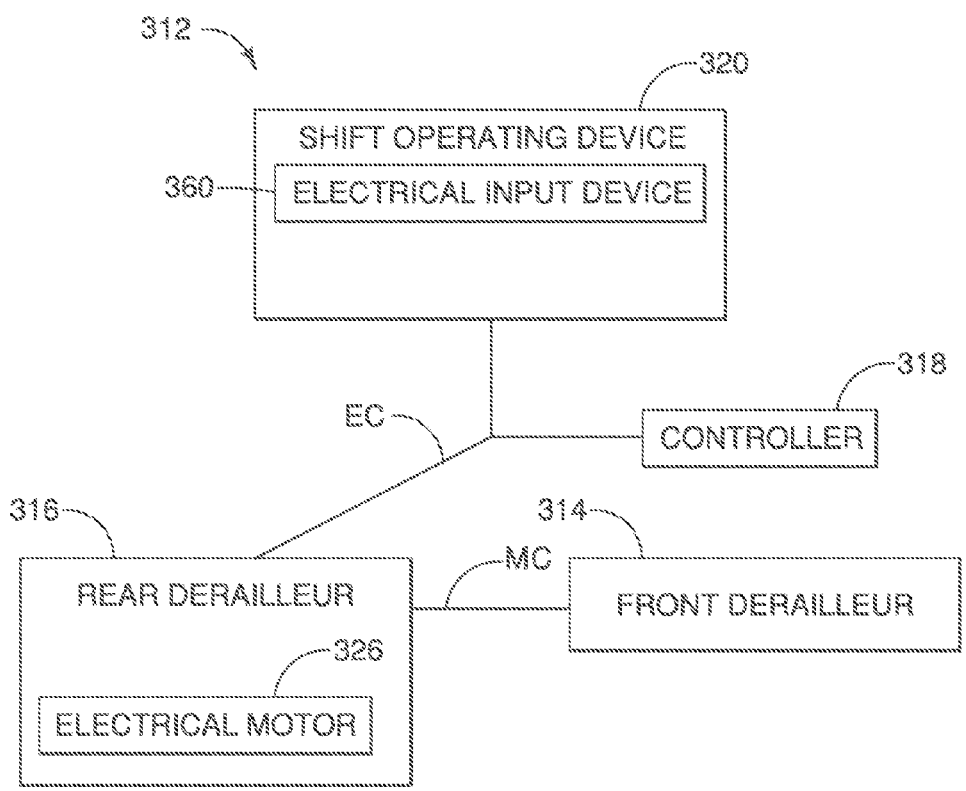
FIG. 10 is a block component diagram of a bicycle shifting system in accordance with a fourth embodiment in which the bicycle shifting system includes a shift operating device, a mechanically operated front derailleur as a first shifting device and an electrically operated rear derailleur as a second shifting device, wherein the shift operating device operates the second shifting device that has an electric motor which operates the mechanically operated front derailleur.

Referring to FIG. 10 is a block component diagram of a bicycle shifting system 312 is illustrated in accordance with a fourth embodiment. Here, the bicycle shifting system 312 basically comprises a first shifting device 314, a second shifting device 316 and a controller 318. The bicycle shifting system 312 further comprises a shift operating device 320 that is configured to selectively operate both of the first shifting device 314 and the second shifting device 316. The first shifting device 314 is mechanically connected to the second shifting device 316. The second shifting device 316 includes an electric motor 326 that mechanically operates the first shifting device 314. The first shifting device 314 is a mechanically operated front derailleur, and the second shifting device 316 is an electrically operated rear derailleur. Hereinafter, the first shifting device 314 will be also referred to as the front derailleur 314, and the second shifting device 316 will be also referred to as the rear derailleur 316.

Similar to the first embodiment, the controller 318 includes a processor for processing the various signals from the various sensors and components of the bicycle shifting system 312. The controller 318 further includes memory that has a shift control program can be stored therein. The memory includes a ROM (Read Only Memory) device and a RAM (Random Access Memory) device. Basically, the controller 318 is configured to operate the first shifting device 314 and the second shifting device 316 in accordance with at least one of a predetermined upshifting route and a predetermined downshifting route. In the fourth embodiment, the first shifting device 314 is controlled by controller 318 based on the current gearshift position of the chain guide of the second shifting device 316. In the fourth embodiment, the memory has pre-stored shift tables such as the synchro-shift gear shift tables of FIGS. 11 to 13.

Basically, the shift operating device 320 includes an electrical input device 360 that is configured to communicate a shift signal to the controller 318. More specifically, the shift operating device 320 includes one or more manual input members (e.g., a button or a lever) that the rider manually operates to activate one or more switches for outputting shift signals to the controller 318. These shift signals are received by the controller 318, which can be mounted on the rear derailleur 316 to operate the selectively the electric motor 326. One of the first shifting device 314 and the second shifting device 316 is mechanically operated, while the other of the first shifting device 314 and the second shifting device 316 is electrically operated by an electrical motor. The electrical motor 326 is configured to mechanically operate the one of the first shifting device 314 and the second shifting device 316.

The electric motor 326 selectively moves one or both of the chain guides of the front and rear derailleurs 314 and 316 by selectively operating electric clutches. Alternatively, the rear derailleur 316 can be provided with a first electric motor for selectively moving the chain guide of the rear derailleur 316, and a second electric motor for selectively moving the chain guide of the front derailleur 314. In any case, an electric motor of the rear derailleur 316 drives an operating cable included in a mechanical connection MC to move the chain guide of the front derailleur 314. For example, the "control means" and the "operating means" disclosed in U.S. Patent Application Publication No. 2014/0179470 can be adapted to an electric motor provided to the rear derailleur 316.

The electrical input device 360 is configured to communicate with the controller 318 via a non-mechanical connection EC which comprises at least one of a power line communication cable, an electrical cable and a wireless communication unit. The controller 318 is configured to communicate with the second shifting device 316 via a non-mechanical connection EC which comprises at least one of a power line communication cable, an electrical cable and a wireless communication unit.

In the third and fourth embodiments, one of the first shifting device 214, 314 and the second shifting device 216, 316 is mechanically operated, while the other of the first shifting device 214, 314 and the second shifting device 216, 316 is electrically operated by the electrical motor 226, 326. The electrical motor 226, 326 is configured to mechanically operate the one of the first shifting device 214 and the second shifting device 216.

Figure 14:
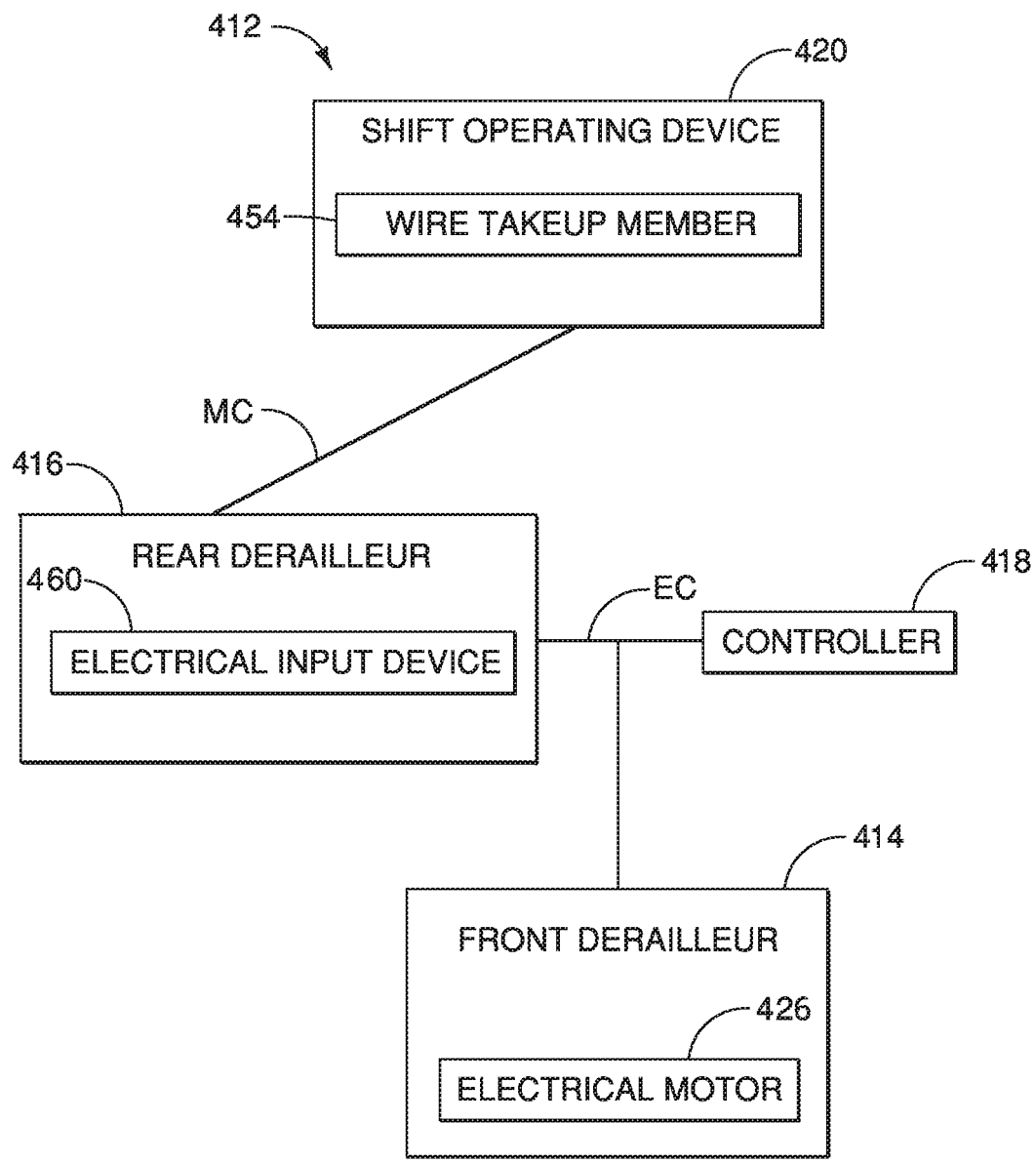
FIG. 14 is a block component diagram of a bicycle shifting system in accordance with a fifth embodiment in which the bicycle shifting system includes a shift operating device, an electrically operated front derailleur as a first shifting device and a mechanically operated rear derailleur as a second shifting device, wherein the rear derailleur has an electrical input device and the front derailleur has an electric motor.

Referring to FIG. 14, a block component diagram of a bicycle shifting system 412 is illustrated in accordance with a fifth embodiment. Here, the bicycle shifting system 412 basically comprises a first shifting device 414, a second shifting device 416 and controller 418. The first shifting device 414 is an electrically operated front derailleur, and the second shifting device 416 is a mechanically operated rear derailleur. The bicycle shifting system 412 further comprises a shift operating device 420 that is configured to selectively operate both of the first shifting device 414 and the second shifting device 416. The first shifting device 414 includes an electric motor 426. Hereinafter, the first shifting device 414 will be also referred to as the front derailleur 414, and the second shifting device 416 will be also referred to as the rear derailleur 416. Basically, the bicycle shifting system 412 is a modification of the bicycle shifting system 12, discussed above.

The shift operating device 420 includes a wire takeup member 454. The wire takeup member 454 is configured to be operatively coupled to the second shifting device 416 by an operating cable included in a mechanical connection MC. The second shifting device 416 includes an electrical input device 460. The electrical input device 460 is configured to operatively communicate a shift signal to the controller 418 for operating the electric motor 426 of the front derailleur 414. The mechanical shifting unit of the shift operating device 420 is basically the same as the mechanical shifting unit of the shift operating device 20.

The electrical input device 460 is configured to communicate with the controller 418 via a non-mechanical connection EC which comprises at least one of a power line communication cable, an electrical cable and a wireless communication unit. The controller 418 is configured to communicate with the first shifting device 414 via a non-mechanical connection EC which comprises at least one of a power line communication cable, an electrical cable and a wireless communication unit. Since power line communication cables, electrical cables and wireless communication units are all well known, these non-mechanical connections are diagrammatically illustrated.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shifting system comprising:
   a first shifting device;
   a second shifting device,
   one of the first shifting device and the second shifting device being mechanically operated, and the other of the first shifting device and the second shifting device being electrically operated;
   a controller configured to operate at least one of the first shifting device and the second shifting device in accordance with at least one of a predetermined upshifting route and a predetermined downshifting route; and
   a shift operating device configured to selectively operate both of the first shifting device and the second shifting device.

2. The bicycle shifting system according to claim 1, wherein
the first shifting device is an electrically operated front derailleur, and the second shifting device is a mechanically operated rear derailleur.

3. The bicycle shifting system according to claim 2, further comprising
a shift operating device configured to operate the second shifting device.

4. The bicycle shifting system according to claim 3, wherein
the shift operating device includes a wire takeup member that is configured to be operatively coupled to the second shifting device by an operating cable, and
the shift shifting device includes an electrical input device that is configured to operatively communicate a shift signal to the controller.

5. The bicycle shifting system according to claim 4, wherein
the electrical input device is configured to communicate with the controller via at least one of a power line communication cable, an electrical cable and a wireless communication unit, and
the controller is configured to communicate with the first shifting device via at least one of a power line communication cable, an electrical cable and a wireless communication unit.

6. The bicycle shifting system according to claim 1, wherein
the shift operating device including a wire takeup member that is configured to be operatively coupled to the second shifting device by an operating cable.

7. The bicycle shifting system according to claim 6, wherein
the shift operating device includes an electrical input device arranged to detect a position of the wire takeup member, the electrical input device is configured to communicate a wire takeup position signal to the controller, the controller controls the first shifting device based on the wire takeup position signal.

8. The bicycle shifting system according to claim 7, wherein
the electrical input device includes one of a magnetoresistive sensor and a Hall Effect sensor.

9. The bicycle shifting system according to claim 1, wherein
the shift operating device is configured to communicate with the controller via at least one of a power line communication cable, an electrical cable and a wireless communication unit, and
the controller is configured to communicate with the first shifting device via at least one of a power line communication cable, an electrical cable and a wireless communication unit.

10. The bicycle shifting system according to claim 1, wherein
the controller includes memory with at least one pre-stored shift table including the predetermined upshifting route and the predetermined downshifting route.

11. The bicycle shifting system according to claim 1, wherein
the predetermined upshifting route includes at least one synchro-shift point, and
the predetermined downshifting route includes at least one synchro-shift point.

12. The bicycle shifting system according to claim 1, wherein
the first shifting device is a mechanically operated front derailleur, and the second shifting device is an electrically operated rear derailleur.

13. The bicycle shifting system according to claim 12, further comprising
a shift operating device configured to selectively operate both of the first shifting device and the second shifting device.

14. The bicycle shifting system according to claim 13, wherein
the shift operating device includes a wire takeup member that is configured to be operatively coupled to the first shifting device by an operating cable, and an electrical input device is configured to operatively communicate a shift signal to the controller.

15. The bicycle shifting system according to claim 13, wherein
the electrical input device is configured to communicate with the controller via at least one of a power line communication cable, an electrical cable and a wireless communication unit, and
the controller is configured to communicate with the second shifting device via at least one of a power line communication cable, an electrical cable and a wireless communication unit.

16. The bicycle shifting system according to claim 1, wherein
the second shifting device is mechanically connected to the first shifting device, and
the first shifting device includes an electric motor that mechanically operates the second shifting device.

17. The bicycle shifting system according to claim 16, wherein
the first shifting device is an electrically operated front derailleur, and the second shifting device is a mechanically operated rear derailleur.

18. The bicycle shifting system according to claim 17, wherein
the shift operating device includes an electrical input device configured to communicate a shift signal to the controller.

19. The bicycle shifting system according to claim 18, wherein
the electrical input device is configured to communicate with the controller via at least one of a power line communication cable, an electrical cable and a wireless communication unit, and
the controller is configured to communicate with the first shifting device via at least one of a power line communication cable, an electrical cable and a wireless communication unit.

20. The bicycle shifting system according to claim 1, wherein
the first shifting device is mechanically connected to the second shifting device, and
the second shifting device includes an electric motor that mechanically operates the first shifting device.

21. The bicycle shifting system according to claim 20, wherein
the first shifting device is a mechanically operated front derailleur, and the second shifting device is an electrically operated rear derailleur.

22. The bicycle shifting system according to claim 21, wherein
the shift operating device includes an electrical input device configured to communicate a shift signal to the controller.

23. The bicycle shifting system according to claim 22, wherein the electrical input device is configured to communicate with the controller via at least one of a power line communication cable, an electrical cable and a wireless communication unit, and the controller is configured to communicate with the second shifting device via at least one of a power line communication cable, an electrical cable and a wireless communication unit.

24. A bicycle shifting system comprising:

a first shifting device;

a second shifting device, one of the first shifting device and the second shifting device being mechanically operated, and the other of the first shifting device and the second shifting device being electrically operated by an electrical motor, the electrical motor configured to mechanically operate the one of the first shifting device and the second shifting device that is being mechanically operated.

25. A shift operating device comprising:

a base member configured to be mounted to a handlebar;

a mechanical shifting unit configured to be mounted to the base member and configured to mechanically operate one of a first shifting device and a second shifting device; and an electrical shifting unit configured to be mounted to the base member and configured to electrically operate the other of first shifting device and a second shifting device.

26. The shift operating device according to claim 25, wherein the mechanical shifting unit includes a wire takeup member configured to be operatively coupled to the one of the first shifting device and the second shifting device by an operating cable.

27. The shift operating device according to claim 25, wherein the electrical shifting unit includes an electrical input device configured to communicate a shift signal to a controller configured to operate at least one of the first shifting device and the second shifting device.

\* \* \* \* \*